(12) United States Patent
Weisbeck

(10) Patent No.: US 11,460,251 B2
(45) Date of Patent: Oct. 4, 2022

(54) APPARATUS AND METHOD FOR PREPARING DENTAL PROSTHETICS

(71) Applicant: Schell Dental Ceramics Inc., Kelowna (CA)

(72) Inventor: Richard Wayne Weisbeck, Kelowna (CA)

(*) Notice: Subject to any disclaimer, the term of this patent is extended or adjusted under 35 U.S.C. 154(b) by 490 days.

(21) Appl. No.: 16/195,476

(22) Filed: Nov. 19, 2018

(65) Prior Publication Data

US 2019/0154336 A1 May 23, 2019

Related U.S. Application Data

(60) Provisional application No. 62/633,525, filed on Feb. 21, 2018, provisional application No. 62/587,939, filed on Nov. 17, 2017.

(51) Int. Cl.
*F27B 17/02* (2006.01)
*A61C 13/09* (2006.01)
(Continued)

(52) U.S. Cl.
CPC ............ *F27B 17/025* (2013.01); *A61C 13/20* (2013.01); *A61C 5/77* (2017.02); *A61C 13/09* (2013.01)

(58) Field of Classification Search
CPC ..... A61C 13/0006; A61C 13/083; A61C 5/77; A61C 8/0012; A61C 13/20; A61C 5/70; A61C 13/0835; A61C 5/35; A61C 5/73; A61C 8/0016; A61C 8/0013; A61C 1/0007; A61C 8/0028; A61C 8/0036; A61C 9/009; F27B 17/025; B28B 11/044; B28B 11/243; B28B 11/046; B28B 11/045;
(Continued)

(56) References Cited

U.S. PATENT DOCUMENTS

| 1,977,704 A | 4/1933 | Vaughan et al. |
| 2,346,579 A | 4/1944 | Henderson |

(Continued)

FOREIGN PATENT DOCUMENTS

EP    1698444    6/2006

OTHER PUBLICATIONS

International Searching Authority, The International Search Report and the Written Opinion of the International Searching Authority, or the Declaration, International Application No. PCT/CA2018/051470, Filed Nov. 19, 2018, 7 pages, Receiving Office—Canadian Intellectual Property Office.

*Primary Examiner* — Justin C Dodson
(74) *Attorney, Agent, or Firm* — Richard D. Okimaw

(57) ABSTRACT

A container and apparatus for preparing dental prosthetics. The container comprises a body having an interior and a top edge, a penetrable lid sealably secured to the top edge and containing a quantity of glazing liquid mixture liquid less than a volume of the body and a quantity of gas having a density greater than air. The apparatus comprises the container, a lid penetrator operable to form at least one penetration through the lid at at least one dipping location, an arm adapted to hold at least one dental prosthetic and pass each dental prosthetic through the at least one penetration into and thereafter out of the glazing liquid mixture, and wherein the arm is adapted to move the at least one dental prosthetic in a drying path after dipping in the glazing liquid mixture so as to form a consistent glazing layer thereover.

24 Claims, 8 Drawing Sheets

(51) Int. Cl.
*A61C 13/20* (2006.01)
*A61C 5/77* (2017.01)

(58) Field of Classification Search
CPC ..... B28B 11/04; B28B 17/0081; B28B 1/002;
B28B 11/00; B28B 17/00; B28B 1/005;
B28B 5/08; B28B 11/06; B28B 11/248;
B28B 1/02; C04B 41/4505; C04B 33/34;
B44C 1/222; B05C 3/10; B05C 1/0813;
B05C 11/1036; B05C 1/02; Y10S 118/03;
Y10S 414/123; A61L 2430/02; A61L
2420/02; A61L 2400/02; B05D 1/18
See application file for complete search history.

(56) References Cited

U.S. PATENT DOCUMENTS

| | | | |
|---|---|---|---|
| 3,384,048 A | 5/1968 | Kutcher | |
| 3,509,686 A | 5/1970 | Bergstrom | |
| 3,890,144 A | 6/1975 | Hansen | |
| 4,253,773 A | 3/1981 | Aho et al. | |
| 4,306,651 A | 12/1981 | Muhlbauer | |
| 4,396,117 A | 8/1983 | Muhlbauer | |
| 4,537,303 A | 8/1985 | Muhlbauer | |
| 4,542,823 A | 9/1985 | Frick | |
| 4,632,243 A | 12/1986 | Muhlbauer | |
| 4,728,531 A * | 3/1988 | Matz | B22C 9/12 34/259 |
| 6,832,682 B1 | 12/2004 | Foster et al. | |
| 7,090,918 B2 | 8/2006 | Leroux et al. | |
| 7,585,369 B2 * | 9/2009 | Larson | B01F 9/04 118/416 |
| 7,931,140 B2 | 4/2011 | Heidenreiter | |
| 8,404,274 B2 | 3/2013 | Sumiyoshi et al. | |
| 10,582,988 B2 | 3/2020 | Fisker et al. | |
| 2007/0013093 A1 | 1/2007 | Lambrecht | |
| 2012/0040102 A1 | 2/2012 | Meredith | |
| 2014/0170600 A1* | 6/2014 | Koncewicz | A61C 13/082 433/222.1 |
| 2019/0126306 A1* | 5/2019 | Bakhshaei | B05B 12/004 |

* cited by examiner

APPARATUS AND METHOD FOR PREPARING DENTAL PROSTHETICS

CROSS REFERENCE TO RELATED APPLICATIONS

This application claims priority to U.S. Provisional Patent Application No. 62/587,939 filed Nov. 17, 2017 and U.S. Provisional Patent Application No. 62/633,525 filed Feb. 21, 2018 both entitled Apparatus and Method for Preparing Dental Prosthetics.

BACKGROUND OF THE INVENTION

1. Field of Invention

The present invention relates generally to dental prosthetics and in particular to an apparatus and method for preparing dental prosthetics with a protective glaze coating.

2. Description of Related Art

Dental prosthetics, such as crowns, dentures, bridges or implants, are commonly used to replace or restore damaged teeth within a patient's mouth. Each dental prosthetic is either permanently secured over a portion of an existing tooth or implant fixture, becoming the outer surface of the tooth, or a removable prosthesis.

Dental prosthetics are prepared in a laboratory using impressions of the patient's teeth so that they will properly fit with the other teeth within the mouth, mimicking the bite properties of the original tooth surface. They may be fabricated using dental ceramics, metals, plastics or a combination thereof. When ceramics or plastics are used, the prosthetic is prepared to mimic the appearance of a natural tooth, including careful preparation of the colour and texture. The final stage of preparing a dental prosthetic is to apply a thin, consistent coat of protective glaze to the surface. Typically, the final coat of glaze is painted on to the prosthetic by a trained technician. This procedure requires skill and can result in an uneven coating thickness, resulting in a less than ideal fit within the patient's mouth.

SUMMARY OF THE INVENTION

According to a first embodiment of the present invention there is disclosed a container for preparing dental prosthetics comprising a container body having an interior and a top edge and a penetrable lid sealably secured to the top edge of the container body. The container further comprises a quantity of glazing liquid mixture within the container body, the quantity of glazing liquid less than a volume of the container body, and a quantity of gas within the container body, the quantity of gas extending between a top surface of the glazing liquid mixture and the lid, wherein the gas has a density greater than air.

The lid may be formed with foil. The container may further comprise an impeller within the container body, the impeller having an impeller axis and a plurality of impeller blades extending from a central hub. The plurality of impeller blades may define dipping locations therebetween. The impeller may include a plurality of magnets therein, distributed around the impeller axis.

The glazing liquid mixture may comprise a mixture of a glazing powder, an evaporative fluid and an emulsifier. The gas may comprise Sulphur Hexafluoride.

According to a further embodiment of the present invention there is disclosed an apparatus for preparing dental prosthetics comprising a base operable to receive a container therein, the container comprising a container body having an interior and a top edge, a penetrable lid sealably secured to the top edge of the container body, a quantity of glazing liquid mixture within the container body; the quantity of glazing liquid less than a volume of the container body, and a quantity of gas within the container body, the quantity of gas extending between a top surface of the glazing liquid mixture and the lid, wherein the gas has a density greater than air. The apparatus further comprises a lid penetrator operable to form at least one penetration through the lid of the container at at least one dipping location, an arm adapted to hold at least one dental prosthetic and pass each of the at least one dental prosthetic through the at least one penetration into and thereafter out of the glazing liquid mixture, and wherein the arm is adapted to move the at least one dental prosthetic in a predetermined drying path after dipping in the glazing liquid mixture so as to form a consistent glazing layer thereover.

The apparatus may further comprise a motor operable to drive an impeller located within the container. The lid penetrator may be operably mounted to the base above the container. The apparatus may further comprise a handle operable to raise and lower the lid penetrator through the lid. The lid penetrator may include a plurality of openings distributed around a central axis. The lid penetrator may include a blade surrounding each of the plurality of openings.

The base may include a temperature control assembly. The temperature control assembly may include a thermoelectric plate positioned within the base to engage upon the container.

According to a further embodiment of the present invention there is disclosed a method for preparing dental prosthetics comprising providing a container body having an interior and a top edge, the container body having a penetrable lid sealably secured to the top edge of the container body and containing a quantity of glazing liquid mixture liquid within the container body less than a volume of the container body and a quantity of gas within the container body, the quantity of gas extending between a top surface of the glazing liquid mixture and the lid, wherein the gas has a density greater than air, forming at least one penetration through the lid at at least one dipping location, passing at least one dental prosthetic through the at least one penetration into the glazing liquid mixture and removing the at least one dental prosthetic from the glazing liquid mixture. The method further comprises moving the at least one dental prosthetic in a predetermined drying path after dipping in the glazing liquid mixture so as to form a consistent glazing layer thereover.

The method may further comprise heating the at least one dental prosthetic in a kiln. The method may further comprise mixing the glazing liquid mixture prior to dipping the at least one dental prosthetic. The mixing may comprises rotating an impeller located in a bottom of the interior of the container body. The impeller may be stopped prior to dipping the at least one dental prosthetic. The at least one dental prosthetic may be dipped between impeller blades of the impeller.

The method may further comprise controlling a temperature of the glazing liquid mixture.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
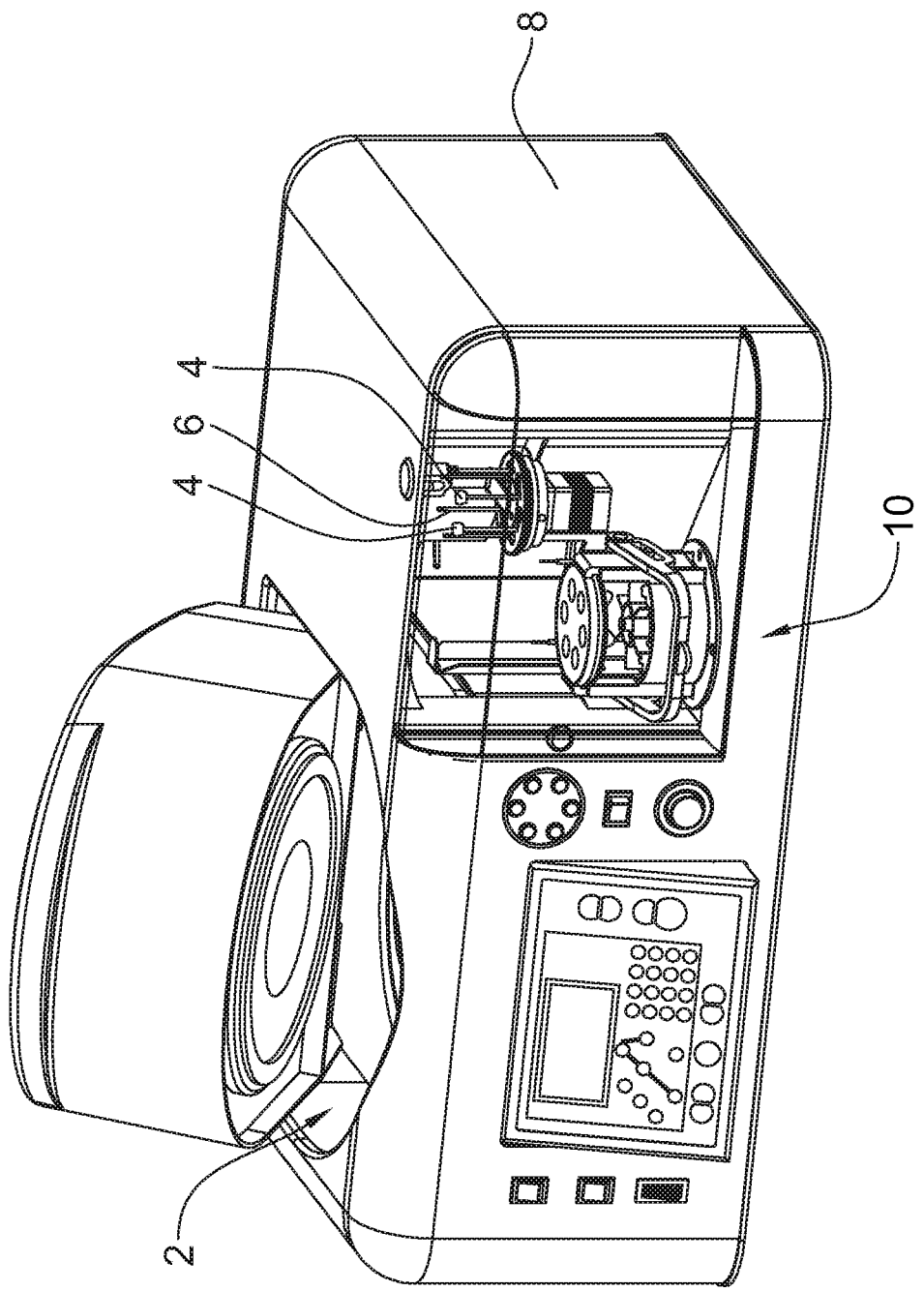
FIG. 1 is a perspective view of a machine having an apparatus for preparing dental prosthetics according to a first embodiment of the present invention.
Figure 7:
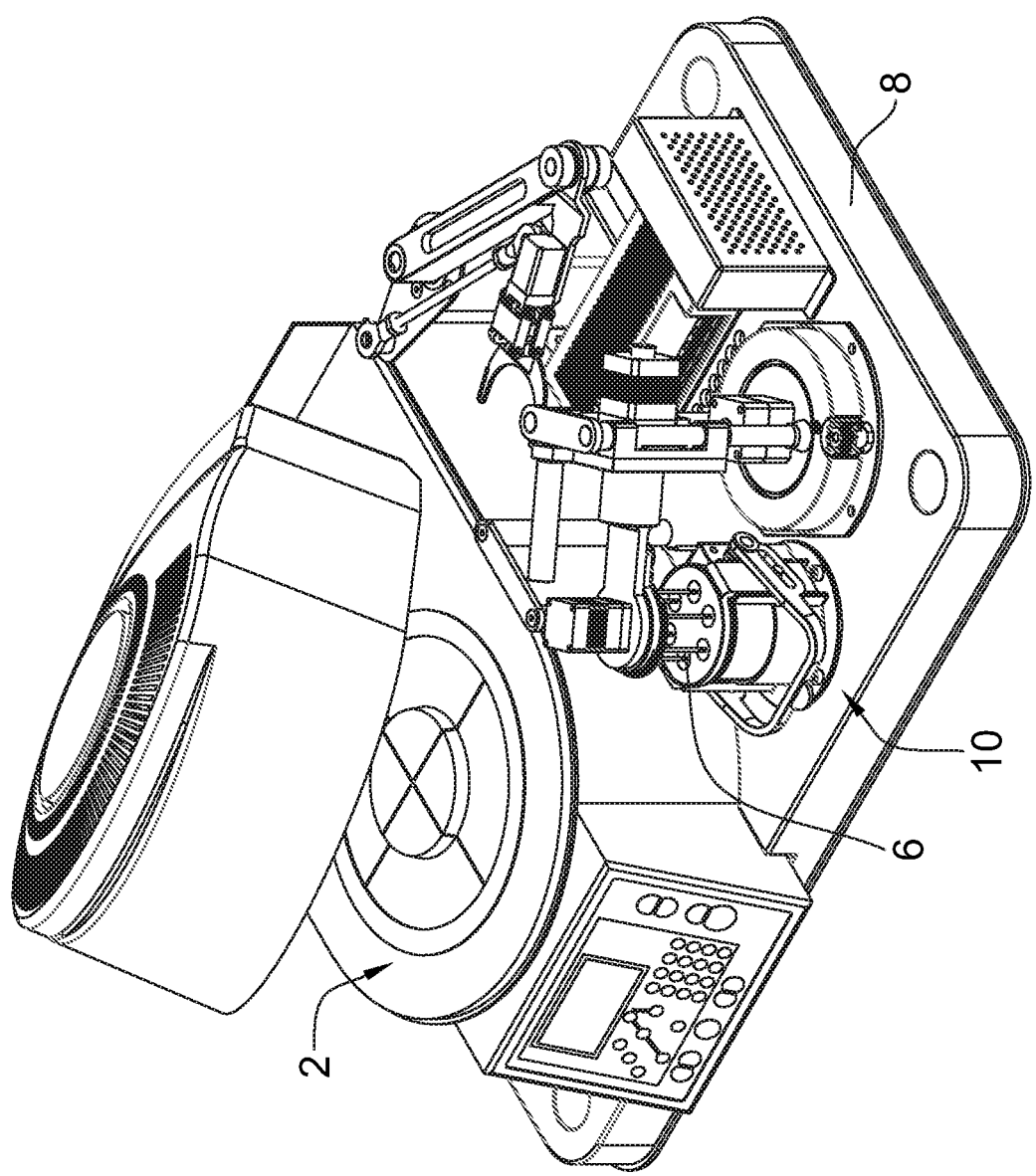
FIG. 7 is a perspective view of the machine and apparatus of FIG. 1, in a dipping configuration.

Referring to FIG. 1, an apparatus for preparing dental prosthetics according to a first embodiment of the invention is shown generally at 10 within a dental glazing machine 8. Dental prosthetics 4, such as crowns, dentures, bridges or implants, are secured to pins 6 with dental putty, as is commonly known. When the machine 8 is started, the robotics within the machine 8 move the dental prosthetics 4 into position, using methods commonly known, above the apparatus 10, then lower the dental prosthetics 4 into the apparatus 10 to apply a liquid glaze coating, as illustrated in FIG. 7. The dental prosthetics 4 are subsequently withdrawn from the apparatus 10 and the robotics perform a predefined series of motions to evenly distribute the glaze over the dental prosthetics 4 before moving them to an oven 2 for firing, as is commonly known.

Figure 2:
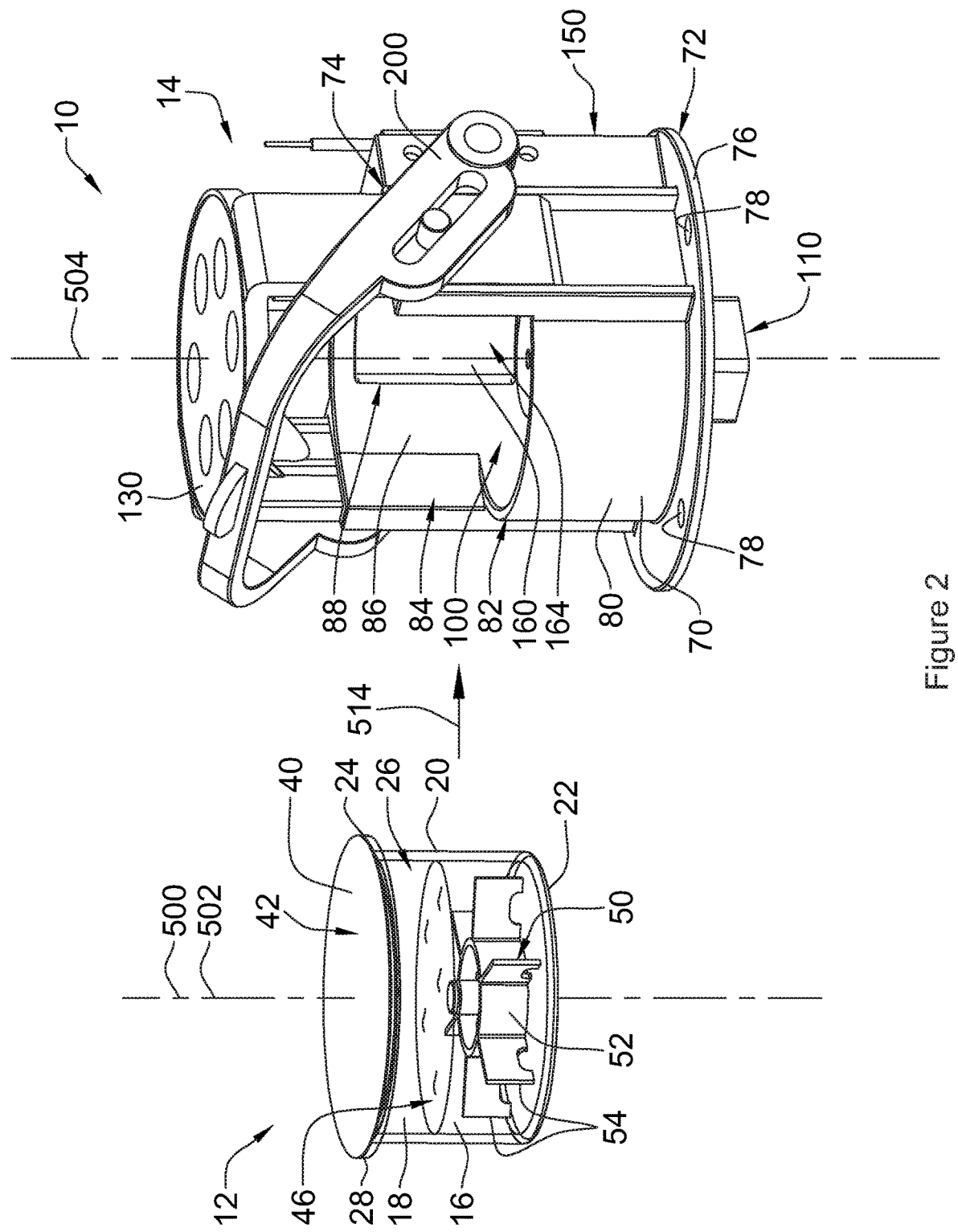
FIG. 2 is a perspective view of the apparatus of FIG. 1, with the container removed.
Figure 3:
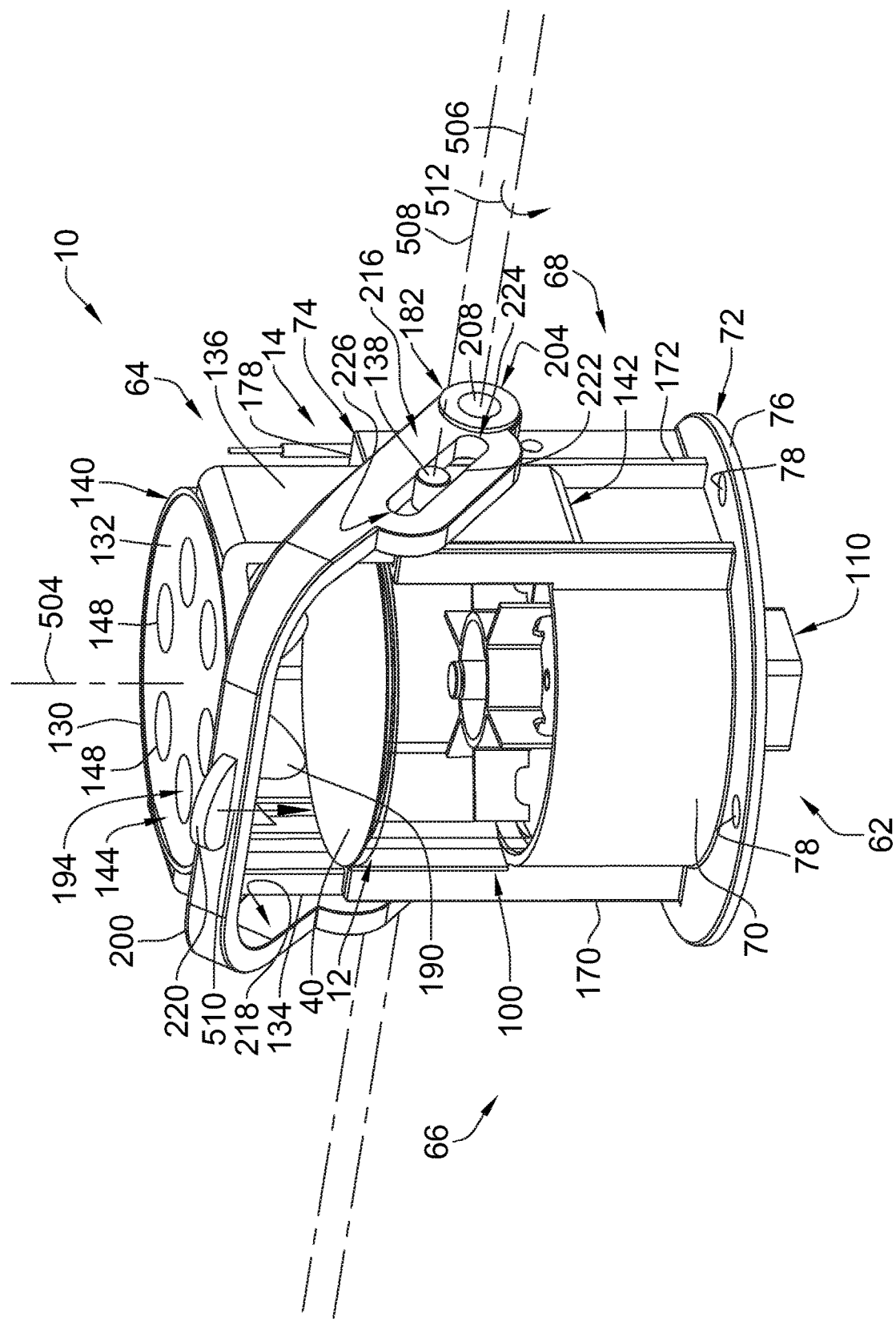
FIG. 3 is a perspective view of the apparatus of FIG. 1, with the container in place.
Figure 4:
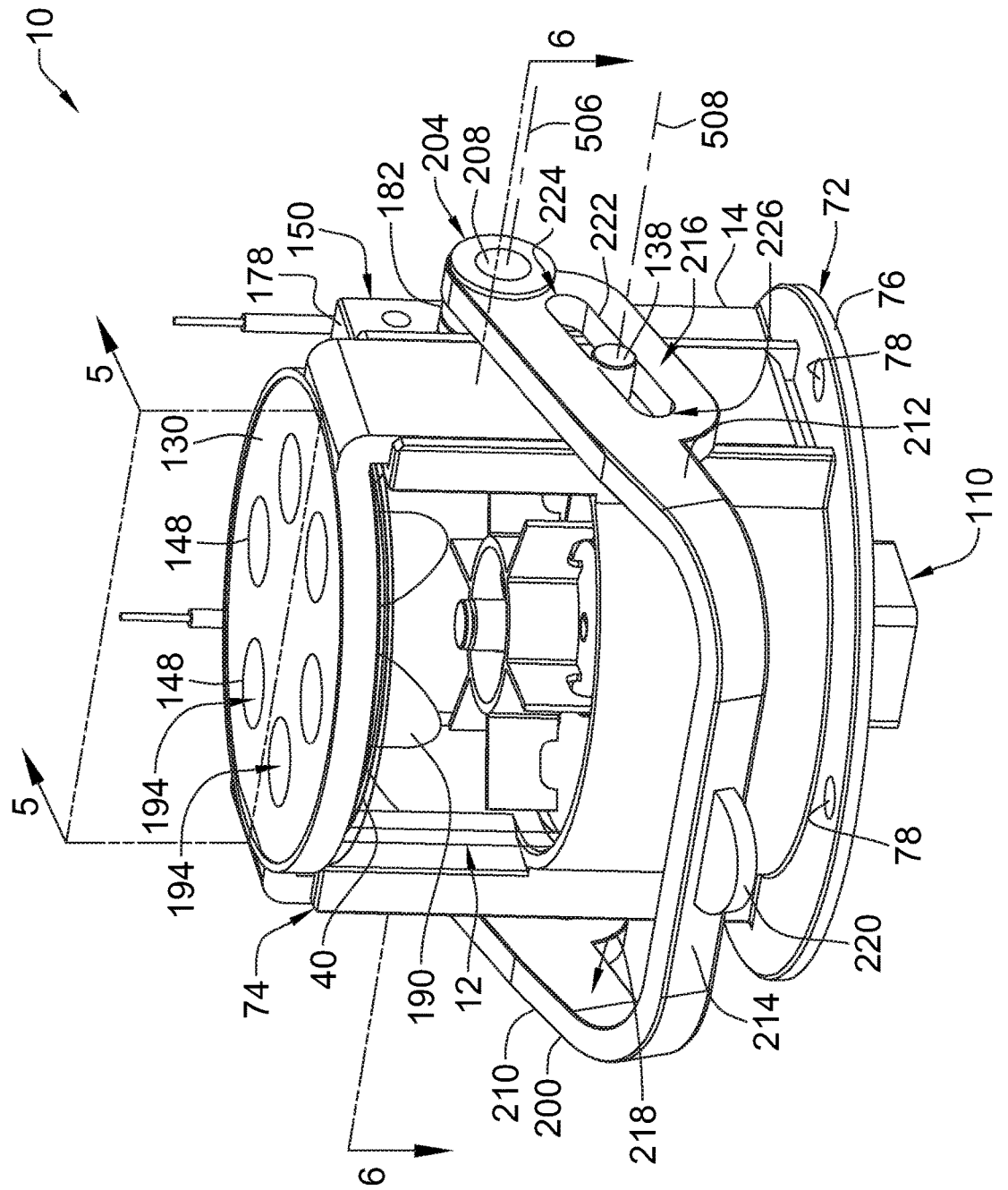
FIG. 4 is a perspective view of the apparatus of FIG. 1, with the container in place and the lid penetrator engaged.

Turning now to FIG. 2, the apparatus 10 comprises a container 12 which is inserted into a base 14 mounted within the machine 8, as set out above. The container 12 may be disposable and replaceable although it will also be appreciated that the container may be refillable and reusable as well. The container 12 contains a liquid glazing mixture 16 and a gas 18 and is sealed with a penetrable lid 40. The base 14 includes a container cavity 100 adapted to receive the container 12 therein with a lid penetrator 130 positioned thereabove. The container 12 is placed within the container cavity 100 in the base 14, as illustrated in FIG. 3, then the lid 40 is penetrated by the lid penetrator 130, as illustrated in FIG. 4 and as will be set out in more detail below, to prepare the apparatus 10 to receive a plurality of dental prosthetics 4 therein such that the dental prosthetics 4 may be coated with the liquid glazing mixture 16. It will be appreciated that the liquid glazing mixture 16 may produce an opaque or washcoat finish, as is commonly known. It will also be appreciated that a coating may be applied rather than a glazing, as is commonly known.

Figure 5:
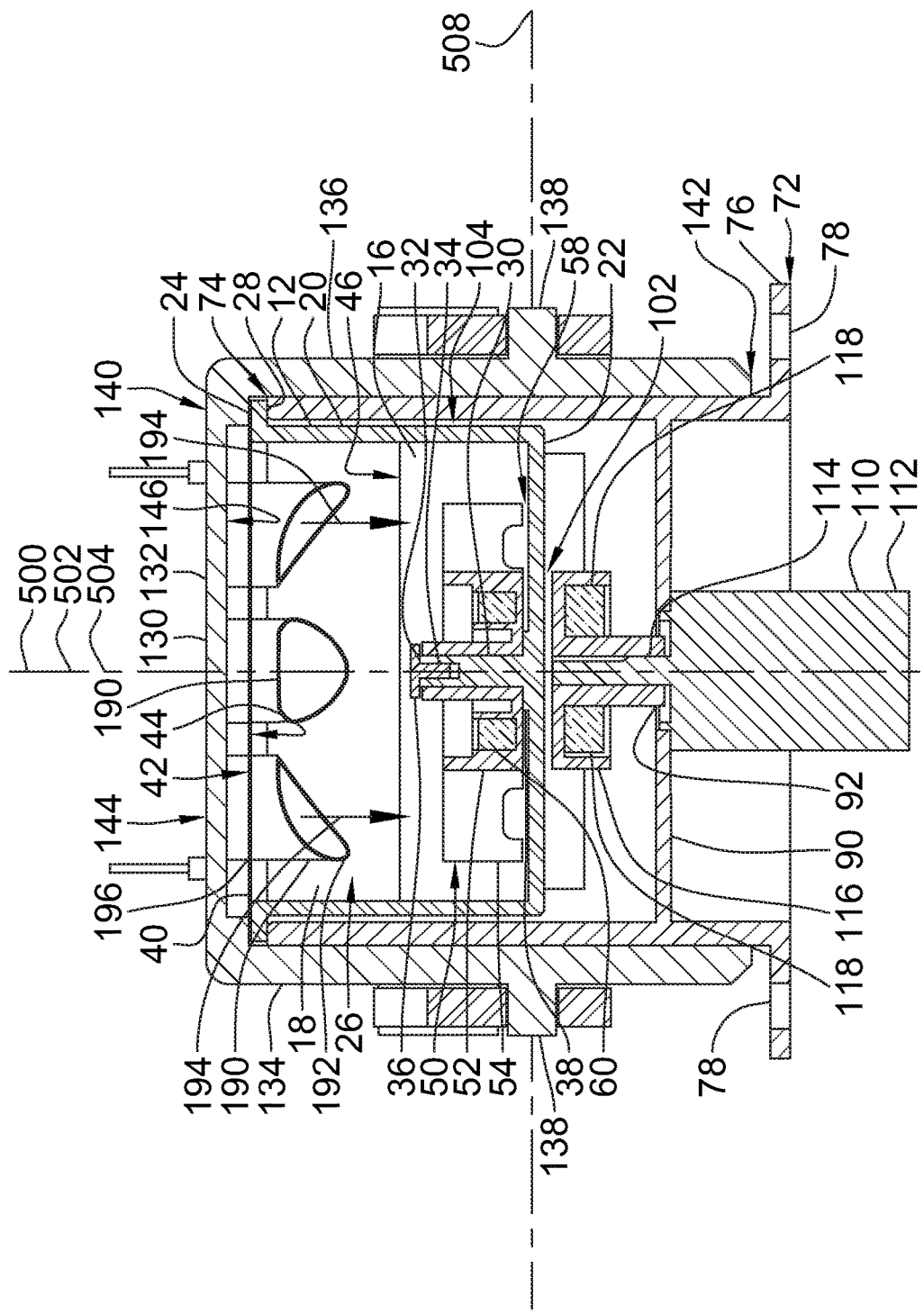
FIG. 5 is a cross-sectional view of the apparatus of FIG. 1, taken along the line 5-5 of FIG. 4.
Figure 6:
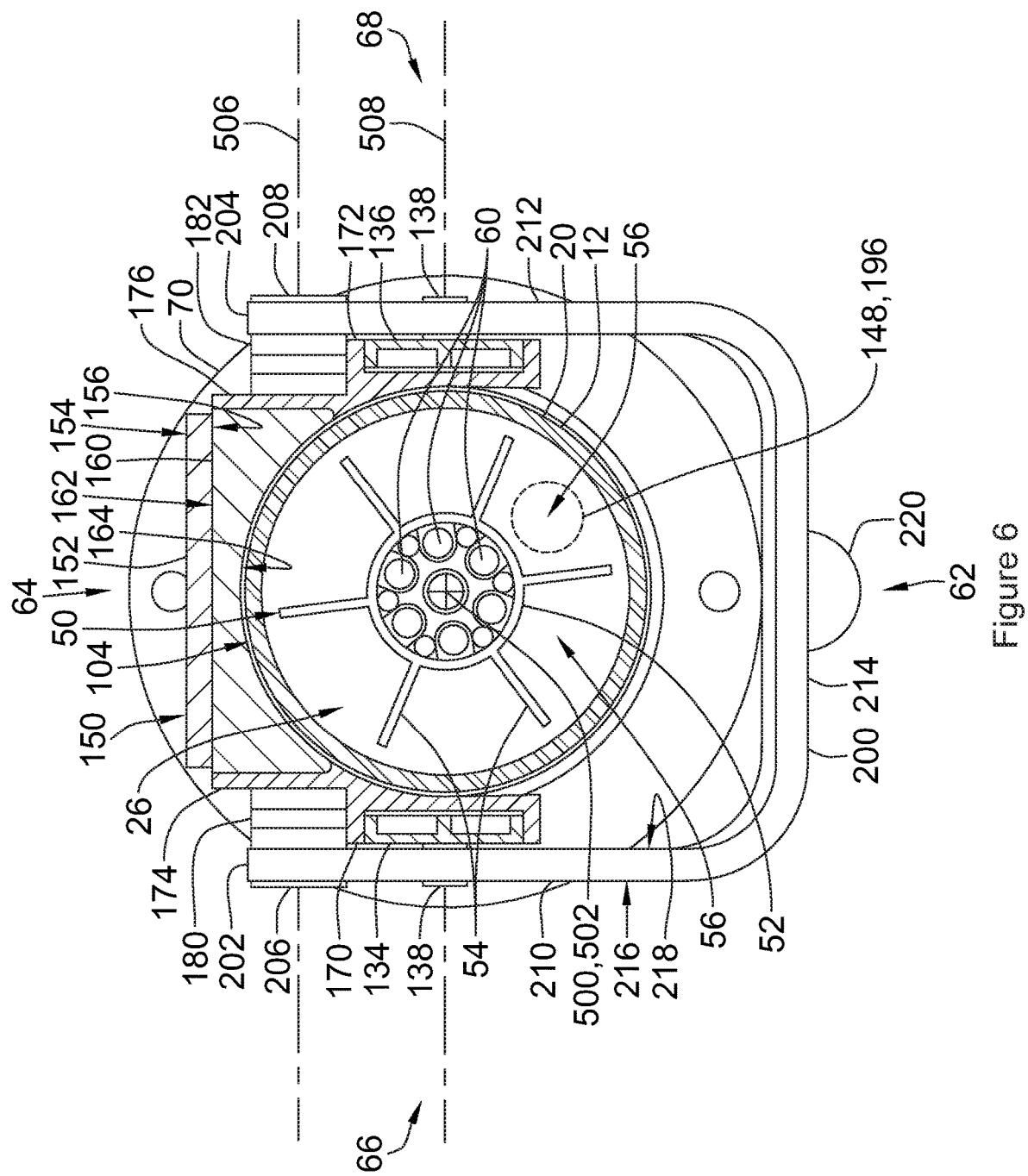
FIG. 6 is a cross-sectional view of the apparatus of FIG. 1, taken along the line 6-6 of FIG. 4.

Referring to FIGS. 2, 5 and 6, the container 12 comprises a cylindrical container body 20, with a container axis 500, which extends between a bottom 22 and a top edge 24 and has an interior 26. It will also be appreciated that although a cylindrical container body is illustrated, that other shapes, such as, by way of non-limiting example, square, triangular, oval or irregular may also be utilized. As best seen in FIG. 5, the top edge 24 is formed with an outer annular lip 28. The container body 20 includes a central shaft 30 along the container axis 500 extending from the bottom 22 to a shaft top 32 within the interior 26, as illustrated in FIG. 5. A shaft bore 34 extends along the container axis 500 into the central shaft 30 from the shaft top 32 and may be threaded, as is commonly known, to receive an impeller retainer 36 therein. The bottom 22 of the container body 20 includes a circular raised portion 38 within the interior 26 around the central shaft 30, the purpose of which will be set out below. The container body 20 may be translucent and may be formed with such as, by way of non-limiting example, Polyethylene terephthalate (PET), although it will be appreciated that other materials may be useful, as well.

The lid 40 has outer and inner surfaces, 42 and 44, respectively, and sealably encloses the container body 20 at the top edge 24. The lid 40 is penetrable and may be formed with such as, by way of non-limiting example, a metallic foil, although other penetrable materials may be useful, as well. The lid 40 may be sealed to the top edge 24 in any conventionally known means such as, by way of non-limiting example, adhesives or heated bonding. It will also be appreciated that the lid 40 may be provided as a removable lid which is not meant to be perforated and is secured to the container body 20 in any known means, such as, by way of non-limiting example, threading or frictional engagement on the container body. It will further be appreciated that more than one lid may be provided in which one lid is penetrable and the other is not.

An impeller 50, with an impeller axis 502, is rotatably mounted on the central shaft 30 about the container axis 500 and retained thereon with the impeller retainer 36, as is commonly known. The impeller 50 comprises a hub portion 52 with a plurality of impeller blades 54 extending radially therefrom. The hub portion 52 engages upon the raised portion 38 to form a gap 58 between the impeller 50 and the bottom 22 of the container body 20. The purpose of the gap 58 is to facilitate rotation of the impeller 50, as is commonly known. It will also be appreciated that other impeller configurations may be utilized for mixing the liquid glazing mixture contained therein. The hub portion 52 includes a plurality of embedded magnetic disks 60, as is commonly known, distributed around the impeller axis 502, the purpose of which will be set out below. Six evenly distributed impeller blades 54 and six magnetic disks 60 are illustrated in the present embodiment of the invention, although it will be appreciated that more or less impeller blades 54 and magnetic disks 60 may be useful, as well. As illustrated in FIG. 6, the impeller blades 54 define a plurality of dipping locations 56 therebetween, the purpose of which will be set out below.

The container body 20 is filled with a quantity of liquid glazing mixture 16 with a top surface 46 and a gas 18 sufficient to cover the top of the impeller 50, as illustrated in FIGS. 2 and 5. Note that for clarity, the liquid glazing mixture 16 and gas 18 are not shown in all Figures. The quantity of liquid glazing mixture 16 may such as, by way of non-limiting example, approximately 40% of the volume of the container 12, with the remaining volume filled with the gas 18, such that the gas 18 extends from the top surface 46 of the liquid glazing mixture 16 to the inner surface 44 of the lid 40. The liquid glazing mixture 16 is comprised of a mixture of glazing powder, an evaporative fluid and an emulsifier. It will be appreciated that the glazing mixture may comprise any known glazing material, such as, by way of non-limiting example, light curing, self-curing or oven fired compositions. The evaporative fluid may be, such as, by way of non-limiting example, alcohol, although other evaporative fluids may be useful, as well. The gas 18 is comprised of Sulphur Hexafluoride ($SF_6$). $SF_6$ is an inert gas which has a greater density than air, as is commonly known, and acts as a "gas blanket" engaging upon the top surface 46 of the liquid glazing mixture 16, thereby protecting against evaporation of the evaporative fluid within the liquid glazing mixture 16. As $SF_6$ has a greater density than air, it will continue to protect the liquid glazing mixture 16 against evaporation when the lid 40 is penetrated, as illustrated in FIG. 5, and as will be outlined further below. It will also be appreciated that other heavier than air gasses may also be utilized. It will also be appreciated that in some applications, such as those where the container body 20 is intended to be used only once, rapidly after opening, or where a less evaporable liquid glazing mixture is utilized, that a gas 18 layer may be optional.

The base 14 includes a base body 70 with the lid penetrator 130 mounted thereon, as outlined above, operable to penetrate the lid 40 with force applied to a lid penetrator handle 200. A motor assembly 110 mounted to the base body 70 is operable to rotate the impeller 50 within the container 12. The base 14 also includes a temperature control assembly 150 to control the temperature of the liquid glazing mixture 16 within the container 12, as will be described in more detail below.

The base body 70 extends between bottom and top edges, 72 and 74, respectively, as illustrated in FIGS. 2 and 5, with a front 62, a back 64, first side 66 and second side 68, as illustrated in FIG. 6. The base body 70 includes the container cavity 100 therein adapted to receive the container 12, as will be set out in further detail below. The base body 70 is essentially cylindrical with a base axis 504 and includes an annular mounting ring 76 at the bottom edge 72 with a plurality of mounting bores 78 therethrough distributed therearound adapted to mount the base 14 to the machine 8 with fasteners, as is commonly known.

A curved front wall portion 80 extends around the front 62 between the first and second sides, 66 and 68, respectively, from the mounting ring 76 to a top edge 82, forming an opening 84 above the top edge 82 and providing access to the container cavity 100. A curved back wall portion 86 extends around the back 64 between the first and second sides, 66 and 68, respectively, from the mounting ring 76 to the top edge 74 and includes a cut out opening 88 therethrough at the back 64, as seen in FIG. 2, the purpose of which will be set out below. Referring to FIG. 5, a horizontal circular plate 90 extends between the front wall portion 80 and the back wall portion 86 and includes a shaft bore 92 therethrough on the base axis 504. The circular plate 90 is raised above the mounting ring 76 and includes a plurality of mounting bores (not shown) therethrough distributed around the shaft bore 92, to which the motor assembly 110 may be secured, as is commonly known.

Referring now to FIG. 5, the motor assembly 110 includes a motor 112 operable to rotate a shaft 114. The motor 112 is mounted to the circular plate 90 with the shaft 114 passing through the shaft bore 92 along the base axis 504, as outlined above. A circular magnetic coupling 116 is mounted to the shaft 114 and includes a plurality of magnetic disks 118 therein, adapted to magnetically couple with the magnetic disks 60 in the impeller 50.

Referring now to FIG. 6, the temperature control assembly 150 is positioned at the back 64 of the base 14 and includes a thermoelectric module 152 with first and second surfaces, 154 and 156, respectively, mounted to a thermoelectric plate 160 with first and second surfaces, 162 and 164, respectively. The temperature control assembly 150 may be used for heating or cooling, as is commonly known. The first surface 162 of the thermoelectric plate 160 is adapted to engage upon the second surface 156 of the thermoelectric module 152, providing a heat transfer surface, as is commonly known. The second surface 164 of the thermoelectric plate 160 is curved and adapted to match the curvature of the back wall portion 86 of the base body 70, and is adapted to be received within the cut out opening 88, as illustrated in FIG. 2. The thermoelectric plate 160 is formed using such as, by way of non-limiting example, aluminium or an aluminium alloy, as is commonly known, although other heat sink materials such as copper or composite materials may be used, as well. It will also be appreciated that other heating or cooling means may also be utilized in place thereof.

Referring now to FIGS. 3 and 6, the base body 70 includes first and second vertical channels, 170 and 172 respectively, at the first and second sides, 66 and 68, respectively, extending between the annular mounting ring 76 and the top edge 74. The first and second vertical channels, 170 and 172, are adapted to slideably receive the lid penetrator 130 therein, as will be set out in more detail below.

As best seen on FIG. 6, the base body 70 includes first and second vertical back wall extensions, 174 and 176, respectively. The first and second vertical back wall extensions, 174 and 176, respectively, extend from the back wall portion 86 towards the back 64 between the mounting ring 76 and the top edge 74 and are spaced apart with the cut out opening 88 therebetween such that the thermoelectric plate 160 may be received therebetween and mounted thereon. A horizontal back wall extension 178 extends between the first and second vertical back wall extensions 174 and 176 at the top edge 74, as illustrated in FIGS. 3 and 4. Returning to FIG. 6, first and second annular pivot mounts 180 and 182, respectively, extend from the first and second vertical back wall extensions, 174 and 176, respectively, along a base pivot axis 506, towards the first and second sides, 66 and 68, respectively, the purpose of which will be set out below.

Referring to FIGS. 3 and 5, the lid penetrator 130 extends between top and bottom edges, 140 and 142, respectively, and includes a circular horizontal top portion 132 with first and second vertical arms, 134 and 136, respectively, extending from the top portion 132 to the bottom edge 142 at the first and second sides, 66 and 68, respectively. As best illustrated in FIG. 6, the first and second vertical arms, 134 and 136, respectively, are adapted to be slideably received within the first and second vertical channels, 170 and 172, respectively, on the base body 70. Each vertical arm, 134 and 136, includes a slide pin 138 extending horizontally therefrom, along a pin axis 508 at a location between the top and bottom edges, 140 and 142, respectively, the purpose of which will be set out below.

The top portion 132 of the lid penetrator 130 has top and bottom surfaces, 144 and 146, respectively, with a plurality of circular openings 148 extending between the top and bottom surfaces, 144 and 146, distributed around the base axis 504. As illustrated in the present embodiment of the invention, there are six circular openings 148, selected to match the number of impeller blades 54 such that the circular openings 148 are adapted to be spaced apart over the dipping locations 56 in the container 12, as will be described further below.

A plurality of blades 190 extend from the bottom surface 146 of the top portion 132. Each blade 190 extends from the bottom surface 146 around the perimeter of each circular opening 148 to a cutting edge 192. Each blade 190 is formed as an oblique circular cylinder with the cutting edge 192 having an oblique curved profile. A dipping passage 194 is formed through each circular opening 148 and blade 190, as will be set out in further detail below. It will also be appreciated that other shapes and configurations for the blades 190 may also be utilized, such as, square, rectangular or irregular and that the cutting surface may be flat or angularly inclined, serrated or even.

Referring to FIGS. 3, 4 and 6, the handle 200 extends between first and second ends, 202 and 204, respectively, and has outer and inner surfaces, 216 and 218, respectively. The handle 200 is pivotably mounted to the base body 70 at the first and second pivot mounts, 180 and 182, respectively, with first and second pivot pins, 206 and 208, respectively, proximate to the first and second ends, 202 and 204. The handle 200 includes first and second side portions, 210 and 212, respectively, extending respectively from the first and second ends, 202 and 204, along the first and second sides, 66 and 68, and are joined by a front portion 214 across the front 62. The front portion 214 may include a handle tab 220 at the front 62. Each of the first and second side portions, 210 and 212, includes a slide pin slot 222 extending between the outer and inner surfaces, 216 and 218, along the first and second sides, 66 and 68, between first and second slot ends, 224 and 226, respectively, adapted to slideably retain the slide pin 138 therein. When the handle 200 is in the raised position, as illustrated in FIG. 3, each slide pin 138 is positioned within each slide pin slot 222 between the first and second slot ends 224 and 226. By applying a force to the handle tab 220 in a direction indicated at 510 on FIG. 3, the handle 200 is rotated in a direction indicated at 512 about the base pivot axis 506, and the slide pin 138 slides within the slide pin slot 222, thereby moving the lid penetrator 130 from a raised position, as illustrated in FIG. 3, to a lowered position, as illustrated in FIG. 4.

To prepare at least one dental prosthetic 4 using the apparatus 10 mounted within the dental glazing machine 8, beginning with the handle 200 in a raised position, as illustrated in FIG. 2, a container 12 is inserted into the container cavity 100 through the opening 84 as indicated at 514. The container 12 is received and retained within the container cavity 100 such that the outer annular lip 28 engages upon the top edge 74 of the base body 70, as best illustrated in FIG. 5 and the container axis 500 is aligned with the base axis 504. In this position, the bottom 22 of the container body 20 is separated from the magnetic coupling 116 by a gap 102 in the range of, such as, by way of non-limiting example, 5/64" to 1/8" (2 to 3 mm). The gap 102 is selected to allow the magnetic disks 118 in the magnetic coupling 116 to magnetically couple with the magnetic disks 60 in the impeller 50 without physically engaging upon the bottom 22 of the container body 20, thus preventing frictional interference. When the container 12 is positioned within the container cavity 100, the magnetic disks 60 and 118 align, as is commonly known, such that the impeller 50 is coupled to the magnetic coupling 116 position, as set by the motor 112.

Referring to FIGS. 5 and 6, the diameter of the container body 20 is selected such that there is a gap 104 therearound between the container body 20 and the base body 70. The gap 104 allows for insertion of the container 12 within the base 14 without resistance, while positioning the container 12 with sufficient proximity to the thermoelectric plate 160 to allow for temperature control of the liquid glazing mixture 16. The temperature control assembly 150 is set to maintain the liquid glazing mixture 16 at an optimum operating temperature to control the evaporation of the evaporative fluid therein.

With the container 12 in the base 14, a user manually lowers the handle 200 in a direction indicated at 510 in FIG. 3, as set out above. As the handle 200 is lowered, the cutting edges 192 of the blades 190 impact the penetrable lid 40, and penetrate therethrough, creating openings 196 in the penetrable lid 40 at each blade 190 and associated circular opening 148, as illustrated in FIG. 5, forming a plurality of dipping passages 194 therethrough, as outlined above. An example of the location of a circular opening 148 and aligned opening 196 in the penetrable lid 40 is illustrated in FIG. 6. When in a stopped position, the impeller is positioned such that the circular openings 148 are located directly above the dipping locations 56, between pairs of impelling blades 54. As the gas 18 is heavier than air, it is maintained within the container 12 following penetration of the penetrable lid 40.

With the container 12 now prepared for dipping, as illustrated in FIGS. 4 and 5, the dental prosthetics 4 are secured onto the pins 6 with dental putty, as is commonly known, as illustrated in FIG. 1. The machine 8 is prepared for operation, and is turned on, by means as are commonly known, such as, by way of non-limiting example, by pressing a start button. The machine 8 moves the pins 6 and attached dental prosthetics 4 into a position aligned above the circular openings 148. The machine 8 utilizes a sensor (not shown) to count the number of dental prosthetics 4 attached to the pins 6. It will be appreciated that the sensors may be mounted on or adjacent to the pins 6 as proximity sensors or may optionally be located at a fixed location and selected to identify the dental prosthetics by way of optical or other sensor techniques as are commonly known. The motor assembly 110 is engaged, rotating the impeller 50 about the impeller axis 502 approximately 10 times at a slow rate of speed, such as, by way of non-limiting example, 1 rotation per second. The glazing powder is held in suspension within the liquid glazing mixture 16 and thus requires mixing just prior to dipping so that the glazing powder does not have time to settle out of the solution. Upon completion of the rotations, the motor assembly 110 stops the impeller 50 in the dipping position as set out above and as best illustrated in FIG. 6.

FIG. 7 illustrates the machine 8 without a cover, for clarity. Referring to FIGS. 5, 6 and 7, the machine 8 lowers the pins 6 and attached dental prosthetics 4 through the dipping passages 194 and into the dipping locations 56 below the top surface 46 of the liquid glazing mixture 16 immediately upon completion of the impeller 50 rotation, ensuring that the glazing powder remains in suspension within the liquid glazing mixture 16. The machine 8 then withdraws the pins 6 and attached dental prosthetics 4 through the dipping passages 194 and performs a series of rolling motions to ensure even coverage of liquid glazing mixture 16 over the dental prosthetics 4, without dripping or pooling of the liquid glazing mixture 16. The rolling motions continue until the evaporative fluid is fully evaporated. It will be appreciated that the exact direction, speed and pattern of the required motion will be varied depending upon the size, shape and configuration of the dental prosthetics 4 to be coated thereby. Upon completion of evaporation, the machine 8 again utilizes the sensor to count the number of dental prosthetics 4 attached to the pins 6, to ensure that count of dental prosthetics 4 matches the original count. The machine 8 then moves the pins 6 and attached dental prosthetics 4 to the oven 2 for firing, as is commonly known. It will be appreciated that some coatings may be light cured rather than fired. Following firing or light curing, the machine 8 moves the pins 6 and attached dental prosthetics 4 back to the start position, as illustrated in FIG. 1, with the dental prosthetics 4 now prepared and ready for use within a patient.

Figure 8:
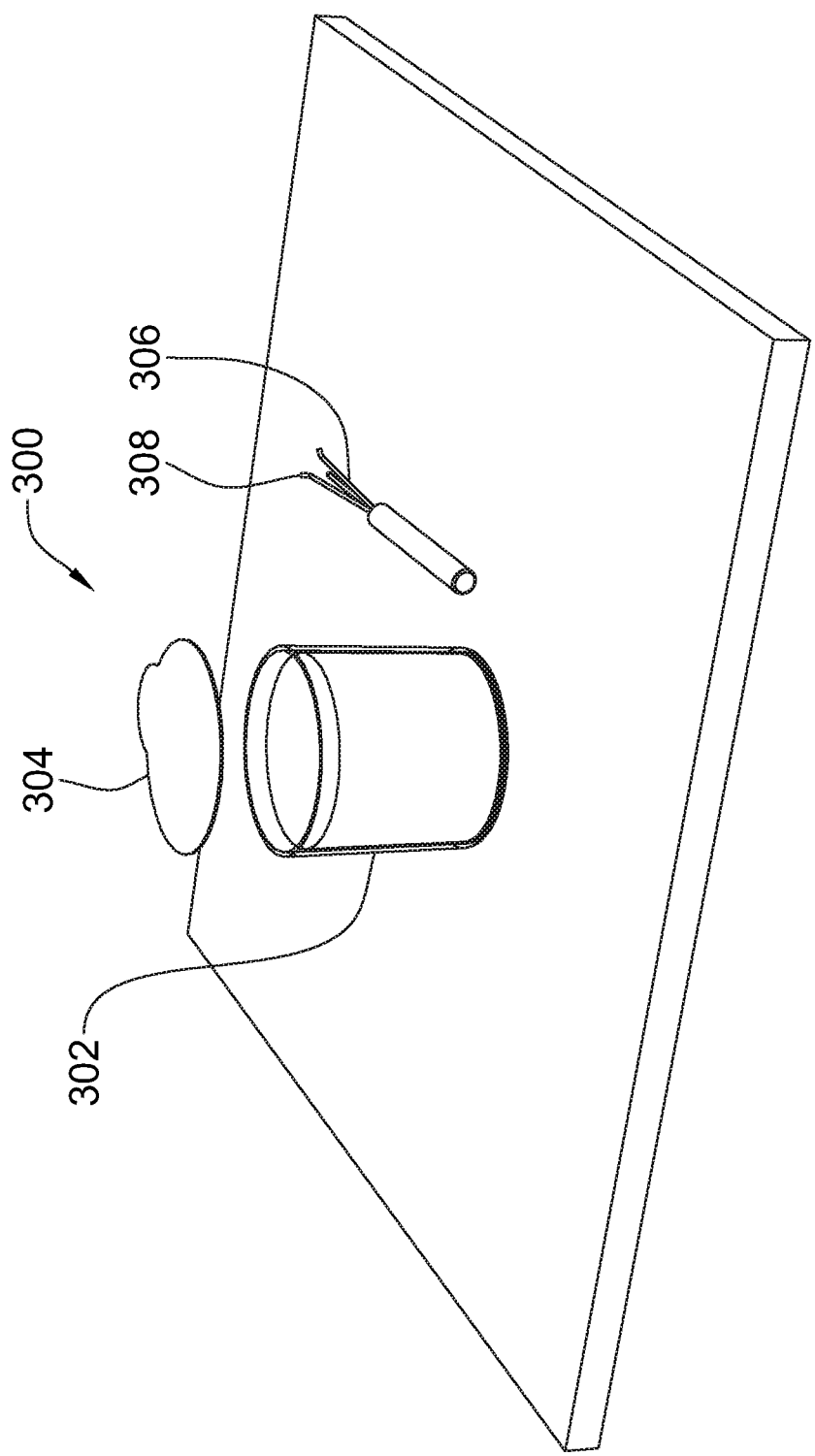
FIG. 8 is a perspective view of a kit for preparing a dental prosthetics according to a further embodiment of the invention.

Turning now to FIG. 8, according to a further embodiment of the present invention, a kit 300 for single use may be provided to form a glaze on a dental prosthetic. The kit 300 comprises a container body 302 containing a liquid glazing material and optionally an inert gas thereover as set out above. The container body 302 may be sealed as set out above or covered by a temporary cover 304. The kit 300 may be provided with a prosthetic holder 306 having an end grip or socket 308 adapted to engage and hold a prosthetic. In use, the cover 304 may be removed and a prosthetic dipped into the liquid glazing material by a user and thereafter rotated or moved in a random patter so as to continuously move the prosthetic while the glaze layer is drying.

While specific embodiments of the invention have been described and illustrated, such embodiments should be considered illustrative of the invention only and not as limiting the invention as construed in accordance with the accompanying claims.

What is claimed is:

1. A method for preparing dental prosthetics comprising:
providing a container body having an interior and a top edge, said container body having a penetrable cover sealably secured to said top edge of said container body and containing a quantity of glazing liquid mixture within said container body less than a volume of said container body and a quantity of gas within said container body, said quantity of gas extending between a top surface of said glazing liquid mixture and said cover, wherein said gas has a density greater than air;
forming at least one opening into an interior of said container body so as to form at least one dipping location comprising a free horizontal surface in the glazing liquid mixture;
passing at least one dental prosthetic through said at least one opening into said container body so as to dip said at least one dental prosthetic into said glazing liquid mixture contained therein through the free horizontal surface of the glazing liquid mixture;
removing said at least one dental prosthetic from said glazing liquid mixture; and
continuously moving said at least one dental prosthetic in a predetermined drying path after dipping in said glazing liquid mixture for a predetermined amount of time until said glazing liquid mixture on a surface thereof is dry so as to form a consistent glazing layer thereover.

2. The method of claim 1 further comprising heating said at least one dental prosthetic in an oven.

3. The method of claim 1 further comprising mixing said glazing liquid mixture prior to dipping said at least one dental prosthetic.

4. The method of claim 3 wherein said mixing comprises rotating an impeller located in a bottom of said interior of said container body.

5. The method of claim 4 wherein said impeller is stopped prior to dipping said at least one dental prosthetic.

6. The method of claim 5 wherein said at least one dental prosthetic is dipped between impeller blades of said impeller.

7. The method of claim 1 further comprising controlling a temperature of said glazing liquid mixture.

8. The method of claim 1 wherein said cover comprise a penetrable lid.

9. The method of claim 1 wherein said cover comprises a removable lid.

10. A container for use in preparing dental prosthetics according to the method of claim 1 comprising:
a container body having an interior and a top edge;
a penetrable cover sealably secured to said top edge of said container body;
a quantity of glazing liquid mixture within said container body, said quantity of glazing liquid less than a volume of said container body; and
a quantity of gas within said container body, said quantity of gas extending between a top surface of said glazing liquid mixture and said cover wherein said gas has a density greater than air,
wherein said container body is operable to have at least one opening formed into the interior thereof so as to form at least one dipping location comprising a free horizontal surface in the glazing liquid mixture sized and positioned to permit at least one dental prosthetic to be passed therethrough so as to dip said at least one dental prosthetic into said glazing liquid mixture through a free horizontal surface of the glazing liquid mixture.

11. The container of claim 10 wherein said cover comprises foil.

12. The container of claim 10 further comprising an impeller within said container body, said impeller having an impeller axis and a plurality of impeller blades extending from a central hub.

13. The container of claim 12 wherein said plurality of impeller blades define dipping locations therebetween.

14. The container of claim 12 wherein said impeller includes a plurality of magnets therein, distributed around said impeller axis.

15. The container of claim 10 wherein said glazing liquid mixture comprises a mixture of a glazing powder, an evaporative fluid and an emulsifier.

16. The container of claim 10 wherein said gas comprises Sulphur Hexafluoride.

17. An apparatus for use in preparing dental prosthetics according to the method of claim 16 comprising:
a base operable to receive a container therein, said container comprising:
a container body having an interior and a top edge;
a penetrable cover sealably secured to said top edge of said container body;
a quantity of glazing liquid mixture within said container body;
said quantity of glazing liquid less than a volume of said container body;
a quantity of gas within said container body, said quantity of gas extending between a top surface of said glazing liquid mixture and said cover, and wherein said gas has a density greater than air;
wherein said container body is operable to have at least one opening formed into the interior thereof so as to form at least one dipping location comprising a free horizontal surface in the glazing liquid mixture sized and positioned to permit at least one dental prosthetic to be passed therethrough so as to dip said at least one dental prosthetic into said glazing liquid mixture through a free horizontal surface of the glazing liquid mixture;

a lid penetrator operable to form at least one opening into said interior of said container body so as to form at least one dipping location comprising a free horizontal surface in said glazing liquid mixture;

an arm adapted to hold at least one dental prosthetic and pass each of said at least one dental prosthetic through said at least one opening into and thereafter out of said glazing liquid mixture through said free horizontal surface in said glazing liquid mixture; and wherein said arm is adapted to continuously move said at least one dental prosthetic in a predetermined drying path after dipping in said glazing liquid mixture for a predetermined amount of time until said glazing liquid mixture on a surface thereof is dry so as to form a consistent glazing layer thereover.

18. The apparatus of claim 17 further comprising a motor operable to drive an impeller located within said container.

19. The apparatus of claim 17 wherein said lid penetrator is operably mounted to said base above said container.

20. The apparatus of claim 19 further comprising a handle operable to raise and lower said lid penetrator through said cover.

21. The apparatus of claim 17 wherein said lid penetrator includes a plurality of openings distributed around a central axis.

22. The apparatus of claim 21 wherein said lid penetrator includes a blade surrounding each of said plurality of openings.

23. The apparatus of claim 17 wherein said base includes a temperature control assembly.

24. The apparatus of claim 23 wherein said temperature control assembly includes a thermoelectric plate positioned within said base to engage upon said container.

* * * * *